United States Patent [19]
Metz

[11] Patent Number: 4,637,572
[45] Date of Patent: Jan. 20, 1987

[54] GAS PROPELLOR FOR GUIDED MISSILE

[75] Inventor: Pierre Metz, Palaiseau, France

[73] Assignee: Thomson Brandt Armements, Paris, France

[21] Appl. No.: 688,638

[22] Filed: Jan. 3, 1985

[30] Foreign Application Priority Data

Jan. 6, 1984 [FR] France ................ 84 00172

[51] Int. Cl.⁴ .................................. F42B 15/033
[52] U.S. Cl. .................................. 244/3.22
[58] Field of Search ............. 244/3.22, 169; 60/229; 239/265.19, 265.27, 265.29

[56] References Cited

U.S. PATENT DOCUMENTS

| | | | |
|---|---|---|---|
| 2,974,594 | 3/1961 | Boehm | 244/169 |
| 3,058,489 | 10/1962 | Corbett | 239/265.25 |
| 3,599,899 | 8/1971 | McCullough | 244/3.22 |
| 3,721,402 | 3/1973 | Holland | 244/3.22 |
| 4,017,040 | 4/1977 | Dillinger et al. | 244/3.22 |
| 4,211,378 | 7/1980 | Crepin | 244/3.22 |
| 4,441,670 | 4/1984 | Crepin | 244/3.22 |

FOREIGN PATENT DOCUMENTS 112755 7/1984 European Pat. Off. .

Primary Examiner—Charles T. Jordan
Attorney, Agent, or Firm—Cushman, Darby & Cushman

[57] ABSTRACT

A gas propellor having at least one pair of diametrically opposed lateral nozzles for supplying a thrust force directed towards the rear of the missile or projectile includes a cake of solid propellant relatively insensitive to the combustion pressure, and opening-closing valves for each of the nozzles. These valves have sliding elements provided with pneumatic flip-flop actuators that are controlled by control circuits including a logic operator which prevents the simultaneous closing of the two nozzles of a same pair. The sliding elements of the valves are provided with mechanical safety means in order to limit the relative displacement of these sliding elements.

8 Claims, 10 Drawing Figures

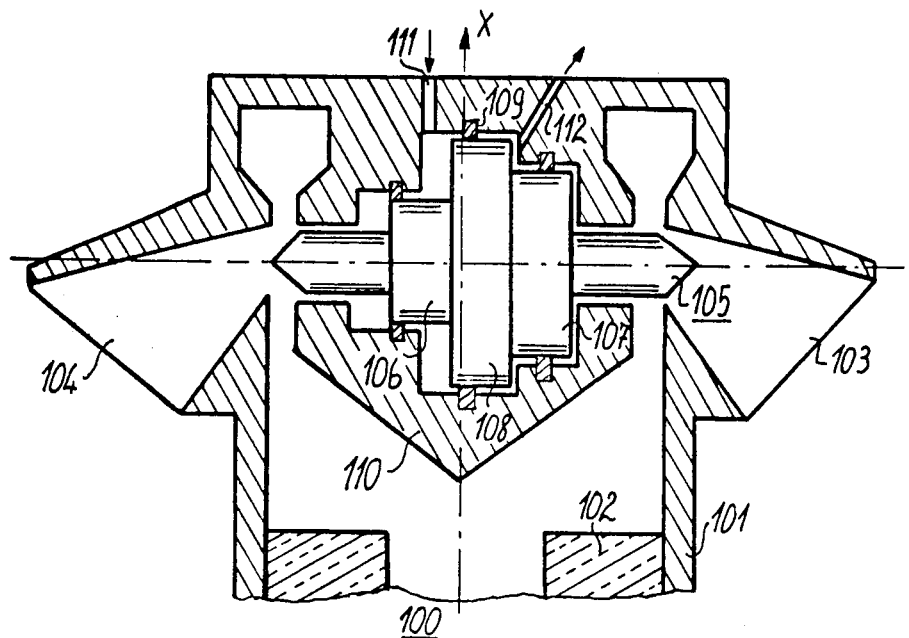
FIG_1 (PRIOR ART)
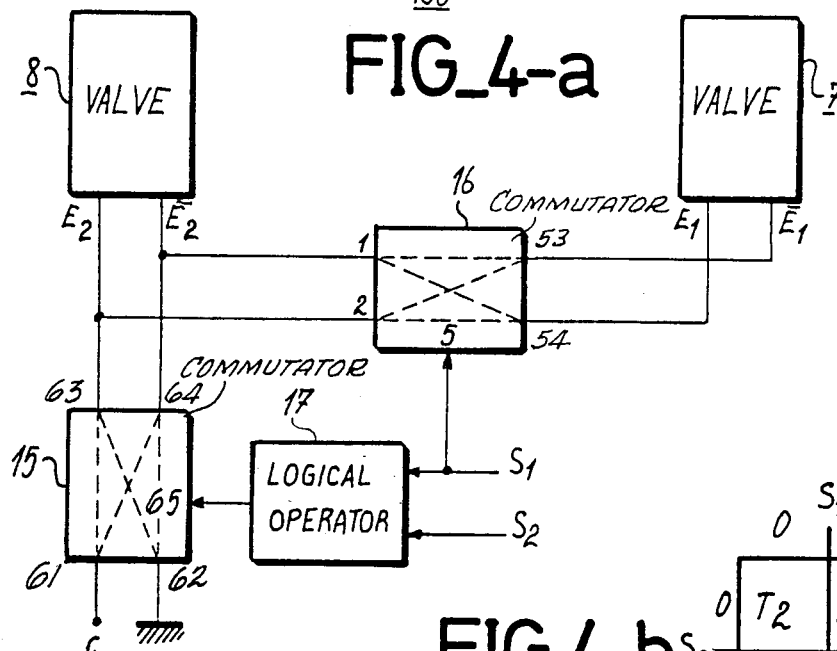
FIG_4-a
FIG_4-b

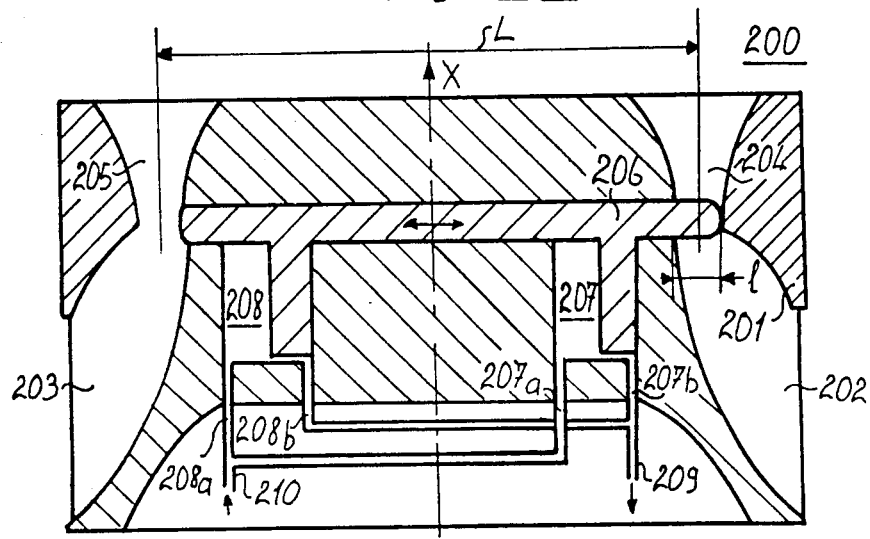
FIG_2 (PRIOR ART)
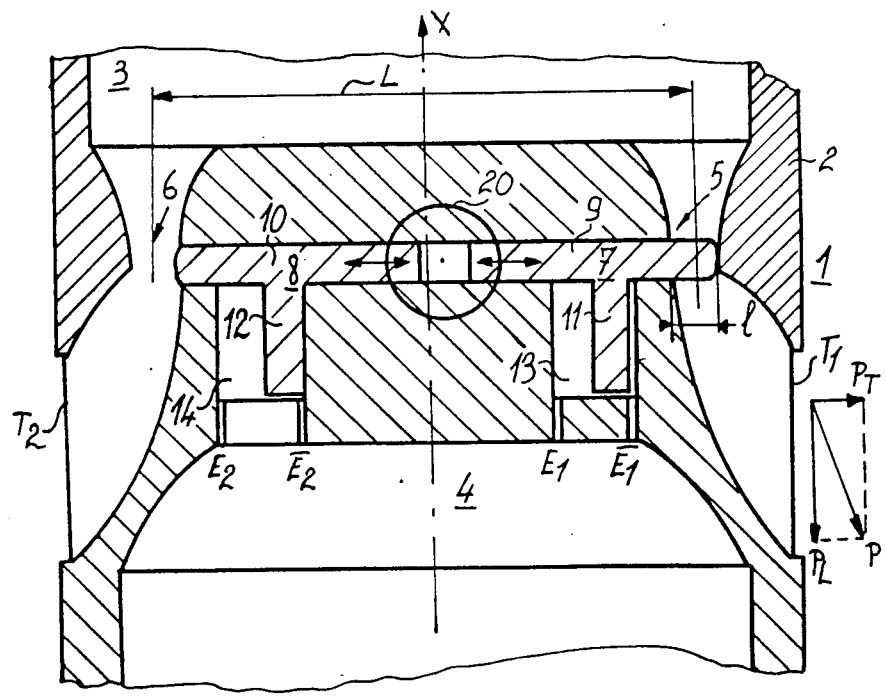
FIG_3

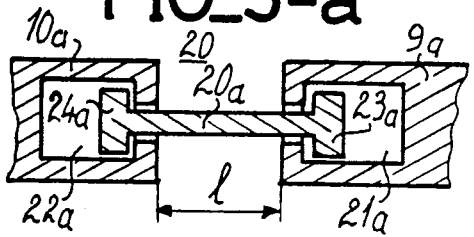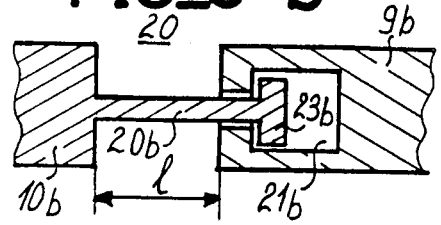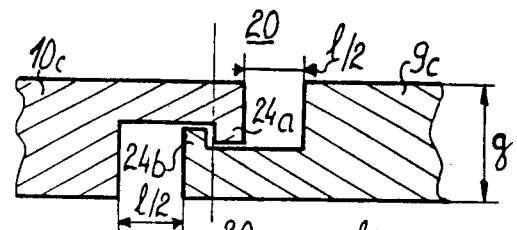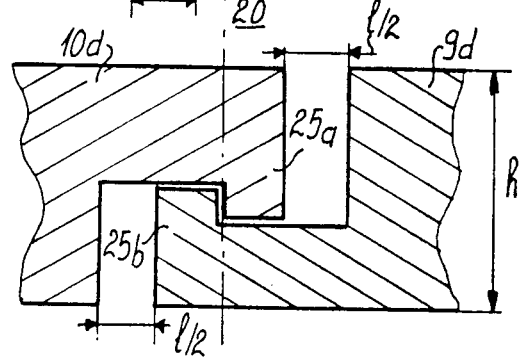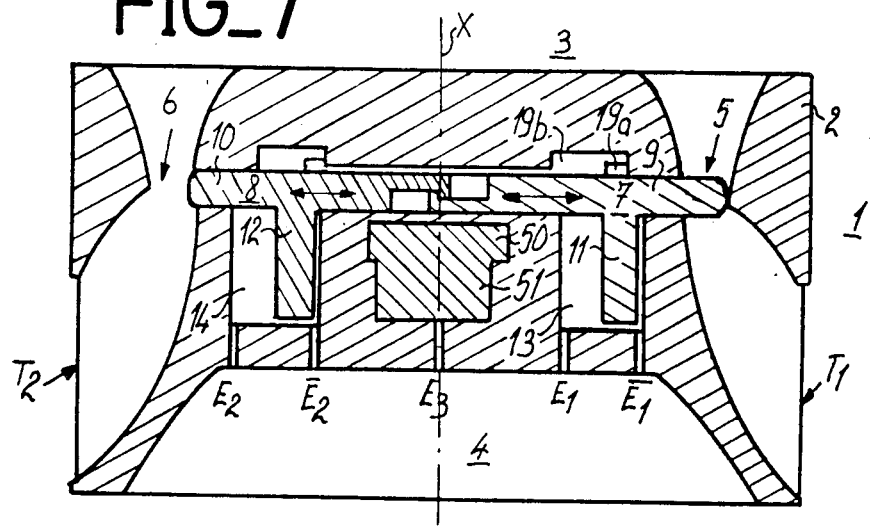

GAS PROPELLOR FOR GUIDED MISSILE

BACKGROUND OF THE INVENTION

1. Field of the Invention

The present invention concerns guided missiles or projectiles and more specifically a gas propellor using a solid propellant and comprising a plurality of nozzles, the relative flow rates of which can be caused to vary in order to alter the flight path of the missile or projectile.

The maneuvering capacity of offensive targets is constantly being improved which means that any interception error (or passage distance) of the projectiles or missiles is consequently increased. During the launch or firing of a missile or projectile, it is necessary to consider the cruising phase during which it is desired to maintain the displacement speed of the projectile, and the terminal phase during which the measured trajectory error must be cancelled out or at least reduced to a value compatible with the efficiency radius of the military charge, which radius can perhaps be zero in the case of a hollow charge.

2. Prior Art

In a guided missile or projectile, it is often advantageous, especially for reasons of weight and costs of the weapons system, to combine into a single propellor device means for allowing the maintenance of the displacement speed and for allowing the projectile to deviate in its trajectory. If the choice of the type of propellant, either solid or liquid, is now considered, it will be observed that this choice is imposed by operating restrictions, which usually lead to selecting solid propellants due to their extended storage capacity. On the other hand, an inherent difficulty in using solid propellants results from the fact that once the combustion has been completely initiated, the combustion pressure must be maintained within relatively narrow limits. A drop in combustion pressure, resulting from too high a gas flow-rate, leads to firing-out the propellor. On the contrary, an increase of the combustion pressure resulting from a decrease of the gas flow-rates provokes accidental explosion of the propellor.

More generally, it is known to deviate the flight trajectory of a missile of projectile by controlling the relative flow-rates of the gas jets supplied by a nozzle assembly suitably disposed at the periphery of the projectile body. It is also known to direct the nozzles towards the rear of the projectile in order to create jointly a longitudinal thrust force and a lateral thrust force.

Solid propellant propellors intended to supply two components of mutually orthogonal force have already been proposed. One component is a longitudinal thrust force of fixed magnitude, and the second component is a magnitude and direction controlled lateral thrust. Solid propellant guiding propellors can be divided into two distinct classes according to the method of operating the means for controlling the relative flow-rates of the gas jets of the nozzles. In a first class, as disclosed in U.S. Pat. No. 4,017,040, each pair of diametrically opposed nozzles is provided with a valve having three stable positions; first and second positions for which the gas flow is directed into one or other of nozzles, and a third position for which the gas flow is delivered at equal rates into the two nozzles. In the second class, illustrated by the device disclosed in French patent application filed under No. 82 21227 on Dec. 17, 1982, each pair of nozzles is provided with a valve having two stable positions and operating according to an "all or nothing" alternate cycle. By varying the cyclic rate of opening the valve, the gas flow can be controllably distributed between the two diametrically opposed nozzles.

The gas propellors of the prior art do not fully overcome the problem raised by the conception of a gas propellor for a guided missile or projectile. The aim of the present invention is to obtain a gas propellor, the operating conditions of which differ according to whether the missile or projectile is in the cruising phase of its trajectory or in the terminal guiding phase to the target.

SUMMARY OF THE INVENTION

The present invention concerns a gas propellor for guided missiles or projectiles, having at least one pair of diametrically opposed lateral nozzles in order to create thrust forces directed towards the rear of the projectile. This projectile includes a cake of solid propellant which is relatively insensitive to the combustion pressure and is disposed in a combustion chamber which is connected to the lateral nozzles, and valves having two stable positions that are controlled by control circuits allowing the prevention of the state or situation corresponding to the simultaneous closing of two nozzles of a same pair.

According to another feature of the present invention, the valves of a pair of nozzles are linked up through mechanical safety means in order to overcome any damage to the valves or their control circuits in order to avoid any accidental explosion of the propellor.

BRIEF DESCRIPTION OF THE DRAWINGS

The invention will be better understood from reading the following detailed description of an embodiment of the gas propellor with reference to the appended drawings in which:

FIG. 1 refers to the prior art and represents a gas propellor in which are included the valves having three stable positions;

FIG. 2 also refers to the prior art and represents a gas propellor in which are included valves having two stable positions;

FIG. 3 is a partial longitudinal cross-section showing an embodiment of a gas propellor according to the invention;

FIG. 4a is a diagrammatic embodiment of control circuits of opening-closing valves of nozzle necks;

FIG. 4b is a table showing the logical states of the logic operator of FIG. 4a;

FIG. 5a represents a first embodiment of mechanical safety means intended to prohibit the simultaneous closing of nozzles necks;

FIG. 5b shows a design alternative of the mechanical safety means of FIG. 5a;

FIG. 6a represents a second design alternative of the mechanical safety means;

FIG. 6b represents a design alternative of the mechanical safety means of FIG. 6a;

FIG. 7 shows the arrangement of the nozzles opening-closing valves in a gas propellor having two pairs of nozzles.

PREFERRED EMBODIMENT OF THE INVENTION

FIG. 1 refers to the prior art and represents a longitudinal cross-section of a gas propellor in which is included a valve having three stable positions. This propellor 100 comprises a hollow cylindrical body 101 which contains a block 102 of a solid propellant. At the end of body 101 are disposed two pairs of diametrically opposed nozzles, only one pair of which is shown in the figure. The relative flow-rates of the gas escaping by the opposite nozzles 103 and 104 is controlled by a pneumatic valve 105 having a cylindrical form. This valve can occupy three stable positions. With this purpose, the valve comprises, in its median portion, three adjacent cylindrical segments of different diameters: a small diameter segment 106 and an average diameter segment 107, which are disposed on either side of a segment 108 having a larger diameter. The sealing of each of these segments is ensured by circular joints 109 disposed in corresponding grooves situated in the body 110 of the valve. Opposite the faces of the median segment 108 having the widest diameter are disposed a first orifice 111 which receives a control pressure and a second orifice 112 which opens onto the outside. When the control pressure applied to orifice 111 has a zero value, valve 105 closes the entrance opening of nozzle 104, and when this control pressure is at a maximal value the valve closes the input opening of nozzle 103. Through wise selection of the control pressure, the valve can occupy a central position for which the gas flow of the generator is evenly distributed between the two nozzles.

FIG. 2 also refers to the prior art and represents, according to a cross-section view, a gas propellor in which is included a valve having two stable positions. Only the section of the propulsor comprising the nozzles and control means of the gas flow have been represented. This section has a cylindrical form and comprises a body in which is disposed at least one pair of diametrically opposed nozzles 202 and 203. These nozzles are connected to a gas generator through independent gas conduits 204 and 205, the distance between the axes of which has a determined length L. A sliding bar 206 allows the alternate closing of the gas conduits of the nozzles. This sliding bar is fitted with two pneumatic cylinders 207 and 208 that are able to occupy two extreme positions, the whole stroke of these cylinders being equal to the width l of the gas conduits. These cylinders comprise input-output orifices 207a, 207b and 208a, 208b that are connected two-by-two in parallel and receive a pneumatic control signal which is applied to their respective inputs 209 and 210. This control signal is a saw-toothed cyclic signal, the cycle frequency of which is relatively high. If the opening cyclic ratio (O.C.R.) of the gas conduits is caused to vary, the relative flow-rates of the gas crossing through the nozzles can be adjusted. Therefore, when the O.C.R. value is equal to one half, the gas flows are evenly distributed between the two opposite nozzles.

FIG. 3 is a partial sectional view that shows one embodiment of a gas propellor according to the present invention. FIG. 3 represents only the portions of the propellor that refer to the lateral nozzles and to the control means for controlling the relative flow rates of the gas crossing through the nozzles. Body 2 of propellor 1 has a cylindrical shape, and its axis of revolution X is directed towards the forepart of the projectile. The gas generator 3 comprises a cake of solid propellant which is disposed into a combustion chamber adjacent to the nozzles block 4. The gas generator does not form part of the invention and its construction will not be described since it is widely known per se. The nozzles block or unit 4 comprises at least one pair of nozzles $T_1$, $T_2$ diametrically opposed, but more generally, it comprises two pairs of mutually orthogonal nozzles $T_1$, $T_2$, as will be described herein-below. The nozzles are located at the periphery of the body of the propellor and suitably inclined in order to create thrust forces directed towards the rear of the projectile. This means that the ratio of the respective magnitudes of the longitudinal $P_L$ and transversal $P_T$ components are well known. The nozzles of the convergent-divergent type comprise necks 5, 6, for example, of rectangular cross-section and having a length l and a height h and the distance between the axes of these necks has a value L. Opposite the necks of the nozzles are disposed valves 7 and 8 for opening and closing the nozzles. A valve comprises a sliding vane and the vane 9 or 10, closing section is equal to the nozzle necks section. The vane movements indicated by a double arrow are ensured by a pneumatic actuator comprising a piston 11 or 12 and a sealed chamber 13 or 14 provided with two input/output orifices $E_1$ $\overline{E_1}$ and $E_2$, $\overline{E_2}$ that are situated on either side of the piston. The stroke of the vane can be controlled to a value l corresponding to the width of the nozzle, which means that each of the nozzles can be completely open or closed. The input/output orifices of the chambers of the actuators are connected to electropneumatic control circuits in order to control the position of the vanes of the valves. When the pressure of the control fluid at orifice $E_1$ is at the high level, the pressure of the control fluid at the orifice $\overline{E_1}$ is at the low level and vane 9 closes the nozzle neck. On the contrary, if the control pressure at orifice $\overline{E_1}$ is at the low level, and the control pressure at orifice $E_1$ is at the high level, vane 9 is drawn in and the neck of the nozzle is free. Operation of the valve 8 is identical to that of valve 7 as described herein-above. The positioning of valves 7 and 8 should not be independent and the simultaneous closing of the two nozzles necks must be prevented.

Reference will now be made to FIG. 4a which schematically represents one embodiment of the control circuits of the closing-opening valves of the nozzles. A gas source G for example, that supplied by the propeller, is connected to the input 61 of a first pneumatic commutator 15 the input 62 of which is connected to a leak path. The outputs of this pneumatic commutator are connected to two gas conduits which are directly connected to valve 8 of nozzle $T_2$ and, indirectly through the intermediary of a second pneumatic commutator 16 to the valve 7 of nozzle $T_1$. The function of the second commutator 16 is, in the first state, to connect the input-output orifices $E_1$ and $E_2$, $\overline{E_1}$ and $\overline{E_2}$ of the valves in order that the vanes of the valves can be displaced in a same direction, and in a second state to cross the connections between the valves so that the vanes can be displaced in opposite directions. The function of the first commutator 15 is to reverse displacement directions of the valve vanes. Control input 55 of the second commutator 16 receives a first control signal $S_1$ having two states, and control input 65 of the first commutator 15 receives control signal $S_1$ and a second control signsl $S_2$ having two states, through the intermediary of a logic operator 17. The corresponding table of the logic operator is given in figure 4b and indicates the opening states of nozzles $T_1$ and $T_2$. The function of this logic operator is to prevent the state or situation corresponding to the simultaneous closing of nozzles $T_1$ and $T_2$.

It is important that any damage that could possibly occur downstream from the control circuits of valves 7 and 8 does not lead to the simultaneous closing of the two nozzles and, consequently, to propeller explosion. FIG. 3 symbolically represents safety means 20 for allowing damage to the valves to be avoided as well as damage to the control circuits of these valves. Safety means 20 comprises "a linking" of the valve vanes which mean that the distance between the ends of the vanes 9 and 10 cannot in any case exceed the value L corresponding to the distance between the nozzles necks.

FIG. 5a represents a first embodiment of safety means 20. The opposite facing ends of vanes 9a and 10a of the valves each comprise a recess 21a and 22a in which a connecting rod 20a provided with stop abutments 23a and 24a is engaged.

FIG. 5b represents a design alternative of safety means 20 described in FIG. 5a. According to this alternative, one of the opposite facing ends of vanes 9b or 10b comprises a recess 21b in which is engaged a rod 20b that is integral with the opposite facing vane 10b; this rod being provided with a stop abutment 23b. The linking device of the vanes comprises a retractable mechanical yoke.

FIG. 6a represents a second embodiment of safety means 20. The opposite facing ends of the sliding vanes 9c and 10c of the valves comprise stop hooks 24a and 24b, which are disposed in the plane having the smallest dimension g of the vanes. These stop hooks mutually overlap in order to limit the relative displacements of the vanes.

FIG. 6b represents a design alternative of the safety means described in FIG. 6a. This design alternative consists in disposing stop hooks 25a and 25b in the plane having the greatest dimension h of the sliding vanes 9b and 10d of the valves.

In the embodiments of the safety means 20 which have been described, the relative displacement of the ends of the sliding vanes that are located in the necks of the nozzles are limited to the value L corresponding to the distance between the axes of the necks of the nozzle and to the value $(L-l)$. It should, however, be noted that the abutments of the vanes can be supplied by auxiliary means disposed on the faces of the vanes.

The passage section of the gas flow thus varies between the value $(l \times h)$ when one of the nozzles is closed and the value $2(l \times h)$ when the two nozzles are open. This means that the combustion pressure $P_c$ of the solid propellant of the gas generator falls when both the necks of the nozzles are jointly opened. This drop in combustion pressure should not provoke the extinction of the propellant, and in order to do this a composite propellant which is less sensitive to the combustion pressure than standard propellants is utilized. It is possible, for example, to utilize a propellant known and solid under the denomination BUTALITE 82.05, manufactured in France by the company SNPE (Société Nationale des Poudres et Explosifs). This means that during the cruising phase of the projectile during which all the nozzles are open, the passage section of the gas flow is doubled, the combustion speed of the propellant is reduced and consequently the thrust forces are lower and the resultant of the transverse components $P_T$ having a zero value, there is no piloting effect, only the longitudinal components $P_x$ are utilized in order to realize the cruising motor function. During the piloting phase of the projectile, the combustion speed is increased due to the closing of one of the nozzle necks, wherein an increase of the thrust force P and a transverse thrust force $P_T$ results.

FIG. 7 is a cross-section view of a block of nozzles that represents the arrangement of the opening-closing valves of a gas propellor having two pairs of mutually orthogonal nozzles in order to ensure the piloting of the guided projectile within two perpendicular planes between them. FIG. 7 only shows sliding vane 50 of one of the valves, piston 51 of the corresponding pneumatic actuator and one of the input-output orifices $E_3$. FIG. 7 also illustrates an embodiment of the stop abutments of the sliding vanes of the opening-closing valves of the necks of the nozzles. One stop abutment comprises a lug 19a disposed on one of the faces of the vane; this lug is engaged in a recess 19b the dimensions of which limit the stroke of the sliding vane to the value l corresponding to the width of the neck of the nozzle.

The description herein-above of the construction of the propellor is given by way of non limitative illustration. In particular, the position of the valves of the nozzles can be displaced as an function of the physical form of the nozzles; the pneumatic actuators can be replaced by hydraulic, and possibly electric actuators.

The gas propellor can be utilized in connection with guided missiles or projectiles that are propelled during the cruising phase of their trajectory.

I claim:

1. Gas propulsion apparatus for a missile, comprising:
   first and second nozzle means, disposed on substantially opposite sides of said missile, for providing thrust force passageways directed to a rear of said missile;
   first and second valve means, movable with respect to each other and movably disposed in said first and second nozzle means respectively, for controlling thrust forces passing through said passageways; and
   control means for controlling said first and second valve means to (a) prevent said first and second nozzle means from being closed simultaneously, and (b) cause said first and second nozzle means to assume one of three positions, in said first position said first nozzle means is open while said second nozzle means is closed, in said second position said first nozzle means is closed while said second nozzle means is open, and said third position both said first and second nozzle means are fully open.

2. Apparatus according to claim 1 wherein said first and second valve means each includes a sliding member, and wherein said control means includes a mechanical linkage coupling together the sliding members to prevent said first and second nozzle means from being simultaneously closed.

3. Apparatus according to claim 2 wherein said mechanical linkage includes first and second hooks coupled to said first and second valve means to cause hook portions of said first and second hooks to overlap.

4. Apparatus according to claim 2 wherein said mechanical linkage includes a retractable link.

5. Apparatus according to claim 1 further including a solid propellant disposed within said missile.

6. Apparatus according to claim 1 wherein said control means includes actuator means for causing said first and second valve means to assume said first, second and third positions.

7. Apparatus according to claim 6 wherein said actuator means includes:
  first and second commutator means for controllng the movements of said first and second valve means; and
  logic operator means, coupled to said first and second commutator means, for causing said first and second commutator means to drive said first and second valve means among said first, second and third positions.

8. Apparatus according to claim 7 wherein said first and second commutator means each include a pneumatic commutator.

* * * * *